UNITED STATES PATENT OFFICE.

THOMAS JENKINS, OF WEBSTER, NORTH CAROLINA, ASSIGNOR TO WALTER S. ADAMS, OF WAYNESVILLE, NORTH CAROLINA.

PROCESS OF TREATING NICKEL ORES, &c.

SPECIFICATION forming part of Letters Patent No. 723,158, dated March 17, 1903.

Application filed August 29, 1902. Serial No. 121,426. (No specimens.)

*To all whom it may concern:*

Be it known that I, THOMAS JENKINS, a citizen of the United States, and a resident of Webster, Jackson county, North Carolina, have invented a new and useful Process of Treating Nickel Ores and other Nickeliferous Material, of which the following is a specification.

This invention relates to a process of treating nickel ores and other nickeliferous material; and its main object is to provide a simple method of treating such material to convert the nickel present into a simple nickel salt suitable for use in the arts without further treatment or readily convertible into metallic nickel, as may be desired, the two compounds most commonly used being, as is well known, the oxid and the sulfate of nickel.

In carrying my invention into effect I may take any suitable material, whether in the form of a matte or the natural ore—such, for example, as the silicate garnierite—and first reduce the same to the proper size to enable the solvent to act thereon. When the process is applied directly to the ore, as will usually be the case, the ore should be crushed to about twenty or thirty mesh and the pulverized material mixed with a suitable solvent, which will ordinarily be either concentrated sulfuric or hydrochloric acid. The iron in the ore is oxidized, preferably, in the usual manner by adding nitric acid, and after the mass has been properly digested it is thoroughly lixiviated with hot water. The acid solution is then separated from the residual ore and contains practically all the nickel contents of the ore, together with iron, alumina, &c. The iron and alumina may then be separated out substantially in the usual manner, calcium carbonate, in the form of powdered marble or chalk, being first introduced into the solution to neutralize the same, and ammonia then added until the ferric oxid and aluminium oxid present are converted into ferric hydrate and aluminium hydrate. These precipitated hydrates should then be separated from the filtrate in the well-known manner, after which the filtered liquid will be practically free from iron, aluminium, and other impurities and may be treated for the removal of the nickel.

I prefer to remove the nickel from the filtrate by adding thereto an alkaline sulfid—such, for example, as sodium sulfid—when all the nickel in the solution will be precipitated as nickel sulfid. This nickel sulfid, which is readily convertible into nickel oxid or nickel sulfate, should then be separated from the liquid by filtration and the precipitated sulfid pressed into cakes.

It will be obvious that nickel sulfid thus obtained may be converted into nickel oxid by simply roasting the sulfid in a suitable crucible or small furnace, the roasting process leaving a nearly-pure nickel oxid.

After roasting, the oxid of nickel may be washed with a dilute acid, such as sulfuric or hydrochloric acid, if desired, to remove from the product any traces of lime which it may contain, and the pure oxid of nickel may then be dissolved in sulfuric acid and water, this treatment being continued until the conversion of the oxid into the sulfate of nickel and its solution is complete. The dilute solution of sulfate of nickel may then be concentrated in the usual manner in suitable vats and crystallized out, collected, and dried in the well-known manner.

From the above description it will be seen that my present invention provides a very simple process for the direct treatment of nickel ores to obtain the compounds of nickel which are most used in the arts and that this process is purely chemical and involves no electrolytic action, such as is characteristic of most of the processes in commercial use for extracting nickel from its ores.

What I claim is—

1. The process of treating nickeliferous material, which consists in subjecting said material to the action of a suitable solvent, precipitating iron from said solution, precipitating nickel from said solution as nickel sulfid, converting said nickel sulfid into the oxid of nickel, and converting said oxid of nickel into the sulfate of nickel.

2. The process of treating nickeliferous material, which consists in subjecting said material to the action of a suitable solvent, precipitating iron and aluminium from said solution, precipitating nickel from said solution as nickel sulfid, and converting said nickel sulfid into oxid of nickel.

3. The process of treating nickeliferous material, which consists in subjecting said material to the action of a suitable solvent, precipitating iron from said solution as ferric hydrate, precipitating nickel from said solution as nickel sulfid, and converting said nickel sulfid into the oxid of nickel.

4. The process of treating material containing nickel and iron, which consists in oxidizing the iron and subjecting the material to the action of a suitable solvent, precipitating iron from said solution as ferric hydrate and removing said ferric hydrate, precipitating nickel from the solution as nickel sulfid, and converting said nickel sulfid into the oxid of nickel.

5. The process of treating material containing nickel and iron, which consists in oxidizing the iron and subjecting the material to the action of a concentrated acid, lixiviating the mass with hot water, precipitating iron from the solution as ferric hydrate and removing said ferric hydrate, precipitating nickel from the solution as nickel sulfid, and converting said nickel sulfid into the oxid of nickel.

6. The process of treating material containing nickel and iron, which consists in oxidizing the iron and subjecting the material to the action of a suitable solvent, adding ammonia to said solution and removing the precipitated ferric hydrate, precipitating nickel from the solution as nickel sulfid, and converting said nickel sulfid into the oxid of nickel.

7. The process of treating material containing nickel and iron, which consists in oxidizing the iron and subjecting the material to the action of a suitable solvent, adding calcium carbonate and then ammonia to said solution and removing the precipitate, precipitating nickel from the solution as nickel sulfid, and converting said nickel sulfid into the oxid of nickel.

THOMAS JENKINS.

Witnesses:
H. C. McKee,
J. W. Adams.